United States Patent [19]

Okada

[11] Patent Number: 5,444,826
[45] Date of Patent: Aug. 22, 1995

[54] IMAGE PROCESSING APPARTUS WHICH PROCESSES A PLURALITY OF COMMAND LANGUAGES

[75] Inventor: Kunio Okada, Kawasaki, Japan

[73] Assignee: Canon Kabushiki Kaisha, Tokyo, Japan

[21] Appl. No.: 356,780

[22] Filed: Dec. 12, 1994

Related U.S. Application Data

[63] Continuation of Ser. No. 818,357, Jan. 9, 1992, abandoned.

[30] Foreign Application Priority Data

Jan. 11, 1991 [JP] Japan ................... 3-014004

[51] Int. Cl.⁶ .............................. G16F 3/12
[52] U.S. Cl. ...................... 395/112; 364/DIG. 2; 364/730.5; 364/920.7
[58] Field of Search .............. 395/650, 106, 112, 114, 395/117

[56] References Cited

U.S. PATENT DOCUMENTS

| | | | |
|---|---|---|---|
| 5,038,298 | 8/1991 | Matsumoto et al. | 364/518 |
| 5,075,874 | 12/1991 | Steeves et al. | 395/112 |
| 5,157,773 | 10/1992 | Matsumoto et al. | 395/375 |
| 5,163,125 | 11/1992 | Okada | 395/115 |
| 5,165,014 | 0/1992 | Vassav | 395/112 |
| 5,317,733 | 4/1994 | Murdock | 395/600 |

*Primary Examiner*—Thomas M. Heckler
*Attorney, Agent, or Firm*—Fitzpatrick, Cella, Harper & Scinto

[57] ABSTRACT

An image processing apparatus for receiving a plurality of data groups, each of which belongs to a different command system of an external apparatus. A data analyzer is included in each command system. A data receiver receives the data from the external apparatus, and a judgment is made as to whether each of the data groups received by the data receiver contains the data analyzer corresponding to the command system of the corresponding data group. A print controller bypasses a data group of a command system judged not to include the data analyzer, and printing is disabled for that data group.

34 Claims, 5 Drawing Sheets

| 501 | 502 | 503 |
|---|---|---|
| PROGRAM ID NO. 1 | $l_1$ | MAIN BODY SHIFT COMMAND CODE SEQUENCE 1 |
| PROGRAM ID NO. 2 | $l_2$ | MAIN BODY SHIFT COMMAND CODE SEQUENCE 2 |
| ⋮ | ⋮ | ⋮ |
| PROGRAM ID NO. j | 10 | 'GOTONATIVE' |
| ⋮ | ⋮ | ⋮ |

IMAGE PROCESSING APPARTUS WHICH PROCESSES A PLURALITY OF COMMAND LANGUAGES

This application is a continuation of application Ser. No. 07/818,357 filed Jan. 9, 1992, abandoned.

BACKGROUND OF THE INVENTION

1. Field of the Invention

The present invention relates to an image processing apparatus capable of processing a plurality of command systems, and more particularly to an image processing apparatus suitable for use with a printer which prints out a plurality of data, each of which is described in a different page description language.

2. Related Background Art

In a conventional printer of this type, a first control program and a second control program, different from the first control program, are selectively used. The first control program is mounted fixedly on the printer main body. The second control program is stored in a storage medium which can be removably mounted on the printer main body.

The second control program is generated by emulating a command system (page description language) of another printer. Therefore, application programs of the other printer can be used by a host computer without modifying them.

In this manner, for example, a high quality command system of the first control program and a conventional command system of low quality can be used compatibly with each other.

In printing data of the second command system supported by the second control program, the host computer first sends a control program selecting command, and then sends data from the second command system to the printer.

However, since the printer is structured to removably mount a storage medium, it may occur that a storage medium storing a third control program supporting a third command system is mounted, and the third command system not supported by the host computer.

In such a case, since the third command system contains some part different from the command system of print data sent form the host computer, printing is disabled.

SUMMARY OF THE INVENTION

It is an object of the present invention to solve the above problem.

It is another object of the present invention to provide an image processing apparatus capable of processing a data group of various command systems preset to the apparatus.

According to the present invention, there is provided an image processing apparatus for receiving a plurality of data groups each belonging to a different command system from an external apparatus and processing the data groups, comprising:

data receiving means for receiving the data groups from the external apparatus;

data analyzing means provided in correspondence with each command system;

means for judging if each of the data groups received by the data receiving means contains the data analyzing means corresponding to the command system of the data group; and print controlling means for passing by a data group of a command system judged by the judging means as not containing the data analyzing means, without printing the data group.

It is another object of the present invention to provide an image processing apparatus capable of processing a plurality of command systems (page description languages) without cumbersome operations by a user.

It is a further object of the present invention to provide an image processing apparatus capable of preventing waste operation when data of a command system unable to be processed by the apparatus is inputted.

The other objects, advantages and effects of the present invention will become more apparent from the following detailed description and claims when read in conjunction with the accompanying drawings,

DETAILED DESCRIPTION OF THE PREFERRED EMBODIMENTS

A preferred embodiment of the present invention will be described with reference to the accompanying drawings.

Figure 1:
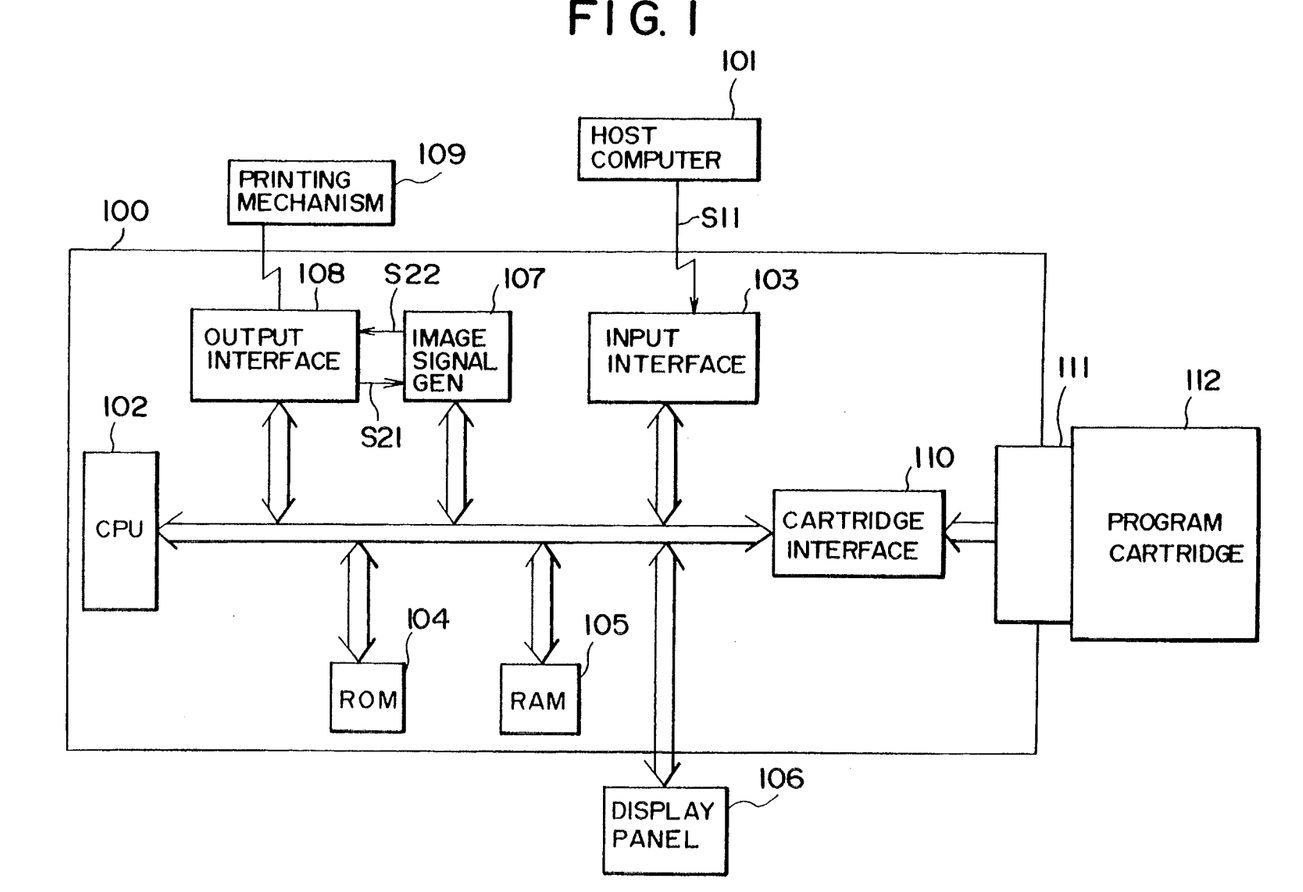
FIG. 1 is a block diagram showing an embodiment of the present invention.

FIG. 1 is a block diagram showing the structure of a laser beam printer according to an embodiment of the present invention. A controller 100 of the printer includes a CPU 102 for controlling the printer, and an interface 103 for receiving data from a host computer 101 via an input signal line S11. The interface 103 informs CPU 102 of data reception.

A ROM 104 stores a first control program (refer to FIG. 6) of a first printer command system (page description language), control information (refer to FIG. 5 for example) used by the first control program, and character dot patterns.

A RAM 105 is used by the control program, and includes a work area for the control program andan image memory area for storing a bit map image of one page of data.

A display panel 106 is constructed of a seven segment LED to display various operation states under control of the CPU 102.

An image signal generator 107 converts an one page bit map image data developed on the image memory area of RAM 105 into an image signal. The generator 107 outputs an image signals 22 to a printing mechanism 109 synchronously with a synchronizing signal S21 sent from the printing mechanism 109.

An output interface 108 interfaces between the controller 100 and the printing mechanism 109.

The printing mechanism 109 receives an image signal from the controller 100, and executes a series of laser beam printer operations, including supply of a recording sheet, turn-on/off of a laser beam, transfer of an image to a recording sheet, and fixation of a transferred image.

An interface 110 interfaces between a program cartridge 112 connected to a cartridge connector 111 and the controller 100. CPU 102 accesses a ROM of the program cartridge 112 via the interface 110, and senses a presence/absence of the cartridge 112.

The program cartridge 112 has a ROM circuit board on which are mounted a ROM and its peripheral circuit elements. The cartridge 112 stores a second control program of a printer command system (hereinafter called a second command system) different from the first control program stored in ROM 104. The second control program controls the laser beam printer, in the same manner as the first control program.

The program cartridge 112 is structured so as to be removably mounted on the cartridge connector 111 of the controller 100. The program cartridge 112 can be replaced with another program cartridge 112 (not shown) which stores a third control program.

The first control program in ROM 104 is called hereinafter a program A, and the second control program in the program cartridge 112 is called a program Bj (j=1, 2, ... : a symbol "B" is used for collectively indicating the second control programs).

Figure 2:
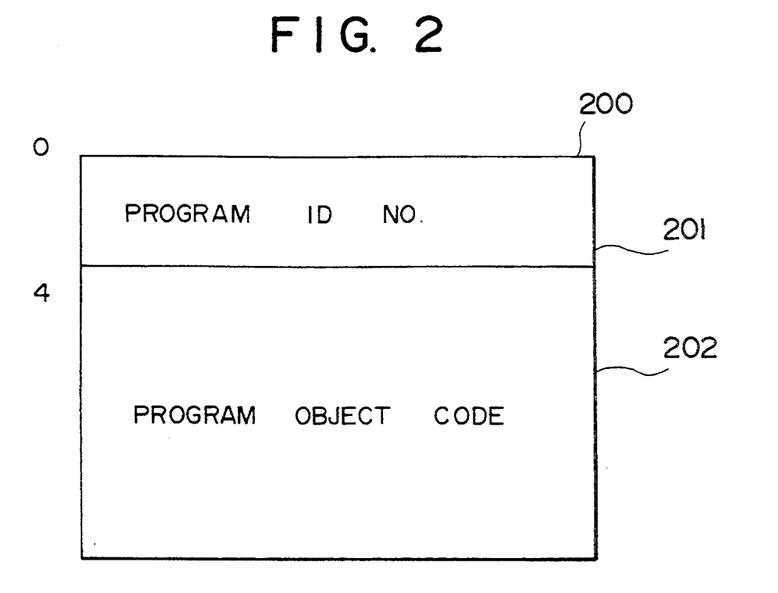
FIG. 2 is a schematic diagram showing the memory structure of a program cartridge according to the embodiment of FIG. 1.

FIG. 2 is a schematic diagram showing the memory structure of the program B stored in the program cartridge 112.

In FIG. 2, an area 201 is a program identification area for storing a program ID number. Each ID number of the control program is stored in this area, having four bytes from the start address "0".

Another area 202 is a program area for storing object codes of the program B, starting from an address "4" of ROM.

Figure 3:
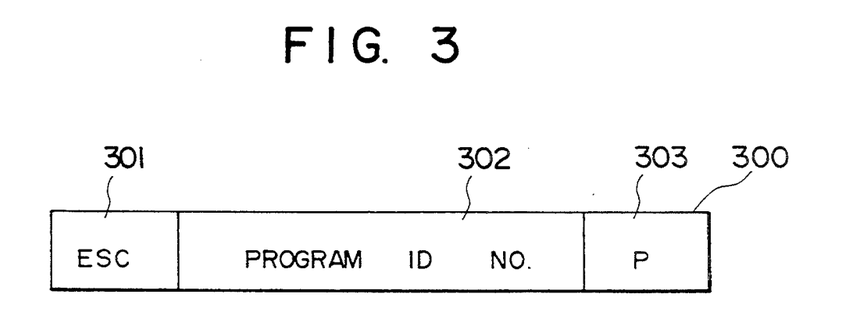
FIG. 3 is a schematic diagram showing the format of a command for instructing to shift a main body side program to a program cartridge side program according to the embodiment of FIG. 1.

FIG. 3 is a schematic diagram showing the format of a program command 300 in the program A stored in the ROM 104. This program command 300 instructs to shift from the program A to the program B in the program cartridge 112.

This command format is of a so-called escape sequence command system. Defined in this command are a control code ESC (1B H) 301 representing the start of the command, an ID number 302 of the shifted program B, and a command terminator P 303 (also used as a command discriminator).

When control is shifted from the program A to the program B in the program cartridge 112, the host computer sends the command 300. The program A analyzes this command 300 to pass the control to the program B in the program cartridge 112.

This command 300 is called hereinafter a cartridge shift command.

Figure 4:
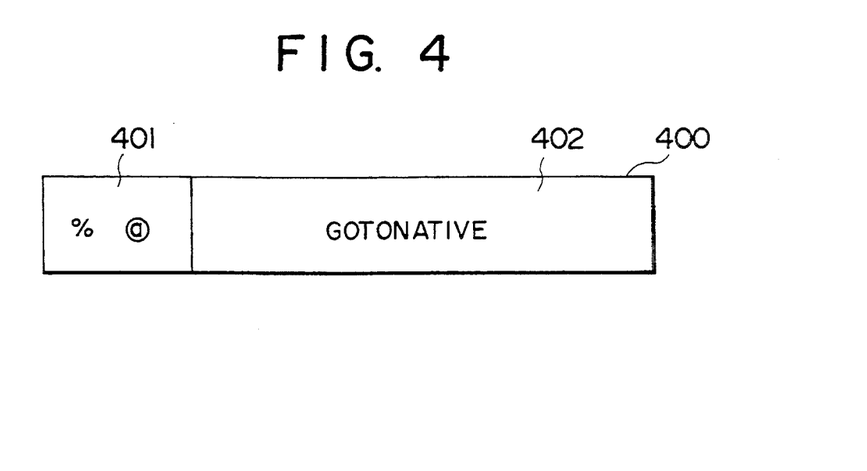
FIG. 4 is a schematic diagram showing the format of a command for instructing to shift a program cartridge side program to the main body side program according to the embodiment of FIG. 1.

FIG. 4 is a schematic diagram showing the format of a program command 400 of the program Bj stored in the program cartridge 112. This program command 400 instructs to shift from the program Bj to the program A stored in ROM 104.

The function of this program command 400 is similar to that of the program command 300 of FIG. 3 for instructing to shift from the program A to the program B. The format matches its command system. In this example, the format is of a text type. A character code sequence 401. "@%" is a command start discriminator followed by a command character sequence 402.

The command character sequence "GOTONA-TIVE" instructs to shift from the program B to the program A. When the program Bj detects this command 400, it passes the control to the program A. Similar to the cartridge shift command 300, this command 400 is sent by the host computer 101.

This command 400 is called hereinafter a main body shift command. Such a main body shift command 400 is prepared for each program Bj matching its command system.

Figure 5:
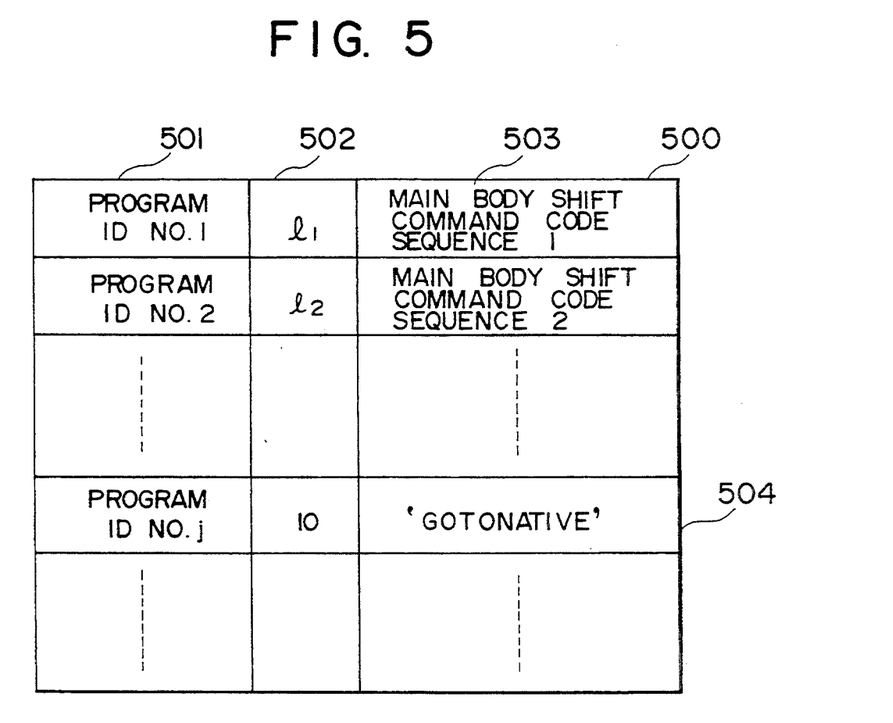
FIG. 5 is a schematic diagram showing the data structure of a main body shift command table according to the embodiment of FIG. 1.

FIG. 5 is a schematic diagram showing the data structure of a main body shift command table stored in ROM 104.

As described above, this printer can use various program cartridges 112, each of which stores different control programs, by mounting each selected program cartridge on the side of the controller 100. The main body shift command table 500 stores main body shift commands matching the command systems of each of these programs B, with table 500 including areas 501, 502 and 503. The area 501 is a program ID number area for storing the ID number of each program B. The area 502 is a command length area for setting the length 1 of the main body shift command. The area 503 is a code area for storing a code sequence of the main body shift command. Sets of these areas are provided, equal in number to the number of available program cartridges, to constitute the table 500.

For example, a set 504 is constructed of an ID number area of a program Bj, a command length area 502, and a main body shift command code area 503.

Next, the control operation of switching between the control program A on the main body side and the control program Bj on the program cartridge side will be described.

Figure 6:
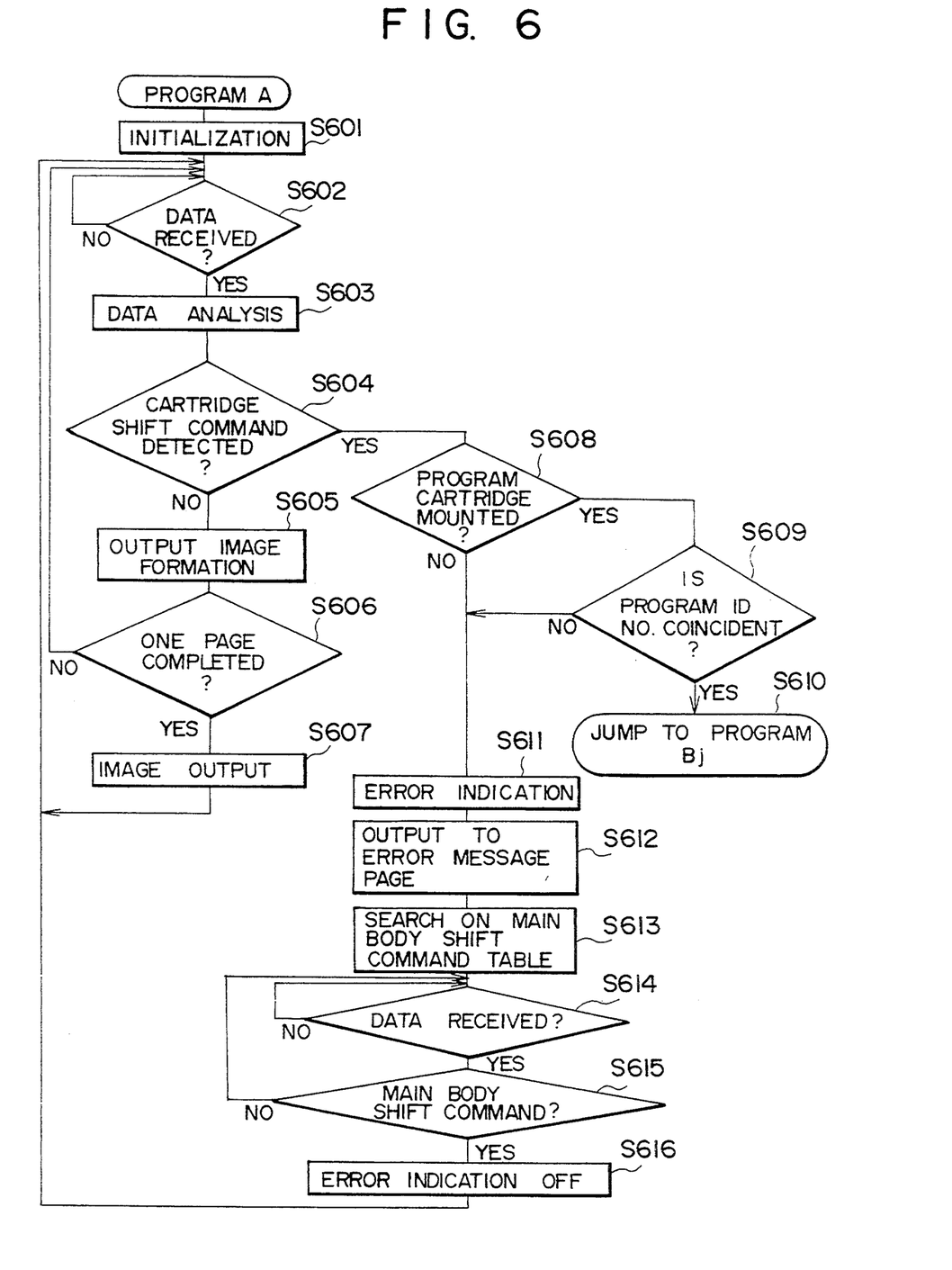
FIG. 6 is a flow chart showing the operation of the main body side program according to the embodiment of FIG. 1.

FIG. 6 is a flow chart showing the operation of the program A. An initializing operation for the program A is first executed (S601). The input interface 103 is checked, and data from the host computer is waited for (S602). When data is received, it is taken from the input interface 103 and analyzed (S603). The input data is discriminated as to whether it is a command or a character code. If the input data conforms with the cartridge shift command 300 shown in FIG. 3 (S604), the flow advances to step S608 to enter a program switching process to be described later. If the input data is discriminated as a character code at step S604, a corresponding character dot pattern is read from ROM 104 (S605) and developed on the image memory area of RAM 105 to generate an image at an output page. The operations from step S602 to step S605 are repeated until data analysis of one page is completed (S606). When an image of one page has been generated, information in the image memory area of RAM 105 is sent to the image signal generator 107(S607) to print the image at the printing mechanism 109. Then, the flow returns to step S602 to process information for the next page.

If the cartridge shift command 300 is detected at step S604, it is determined whether or not the program cartridge 112 is mounted (S608). If the cartridge 112 is mounted, it is determined whether or not the program ID number 302 indicated by the cartridge shift command 300 is the same as the program ID number set in the program identification area 201 at the cartridge 112 (S609). If they coincide with each other, it means that the designated program Bj exists so that the flow jumps to the top of the program area 202 at the cartridge 112 to pass the control to the program Bj (i.e., jump to step S701 to be described later) (S610).

If it is determined at step S608 that the program cartridge 112 is not mounted, or if the program ID numbers are not coincident with each other at step S609, this means that the program Bj designated by the host computer 101 does not exist. In this case, the flow advances to step S611.

An alarm mark is displayed as an error indication on the display panel 106 (S611) to thereby notify an operator of an absence of the designated program Bj. Character dot patterns representative of the character sequence of an error message are developed on the image memory area of RAM 105 to print out the error message at the printing mechanism 109 (S612).

After the host computer 101 sends the cartridge shift command to the printer, it transfers a data group for the program Bj.

Using the program ID number 302 of the cartridge shift command 300 detected at step S604, the main body shift command table 500 is searched to read the code sequence in the corresponding main body shift command area 503 (S613). In this example, the set 504 corresponding to the program Bj is selected to read the main body shift command code sequence "@% GOTONATIVE".

Thereafter, data from the host computer 101 is waited for in a manner similar to step S602 (S614). The operation at step S614 continues without printing the received data until the main body shift command code sequence "@% GOTONATIVE" is received (S615).

After the main body shift command code sequence is detected, the host computer 101 transfers a data group for the program A. Therefore, the alarm mark on the display panel 106 is deleted (S616), and the flow returns to step S602 to further continue the data processing.

Figure 7:
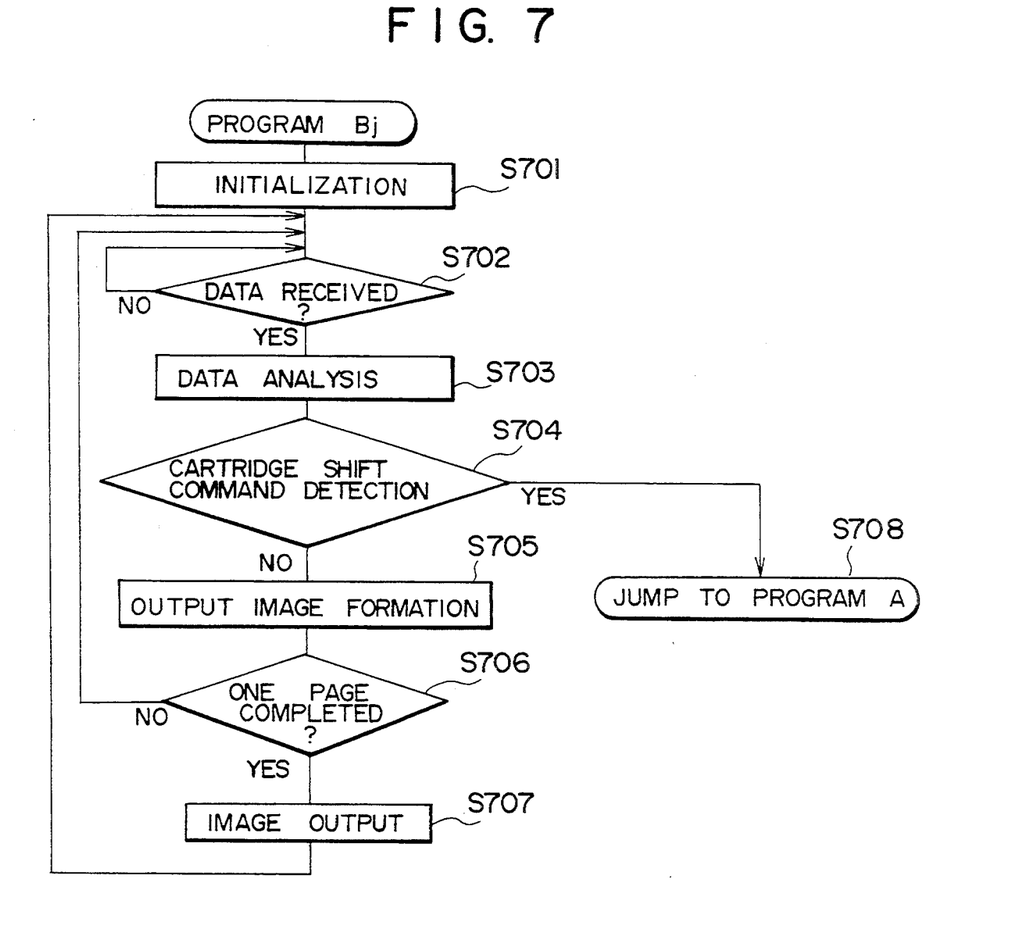
FIG. 7 is a flow chart showing the operation of a program cartridge side program.

FIG. 7 is a flow chart showing the operation of the program Bj at the program cartridge 112.

When control is passed to the program BJ from step S610 for the program A, an initializing operation for the program Bj is executed to reset the state of the controller 100 used by the program A (S701).

Next, data from the host computer 101 is waited for (S702). The inputted data is analyzed (S703) to discriminate between a command and a character code which match the command system supported by the program Bj.

If the inputted data is the same as the main body shift command 400 shown in FIG. 4 (S704), the control is passed to the program A in ROM 104 (i.e., to step S601) (S708).

If the inputted data is a character code at step S704, a corresponding character pattern is developed on the image memory area of RAM 104 (S705). The operations from step S702 to step S705 are repeated until an image of one complete page is generated (S706). Upon generation of an image of one page, the image information is sent to the image signal generator 107 to print one page image at the printing mechanism 109 (S707).

The flow returns to step S702 to further process the next page.

As described above, the main body shift command table stores the format of a shift command to the first control program, the shift command having been defined by the second control program. Therefore, even if a designated second control program does not exist, a data group used for the second control program sent from the host computer can be passed by without printing it, until the first control program is obtained. As a result, it is possible to avoid waste prints without temporarily stopping the printer.

In the above embodiment, only one cartridge connector 111 is used. A plurality of connectors may be used to mount a plurality of program cartridges each having a different control program. In such a case, the first control program selects one of the control programs having a program ID number the same as that in the cartridge shift command. In this manner, the host computer can automatically select one of a plurality of control programs, allowing to print various data, each having a different command system.

Furthermore, in the above embodiment, one program cartridge has one control program. A plurality of program identification areas 201 and program areas 202 as shown in FIG. 2 may be provided. Similar to a plurality of cartridges, the host computer can automatically select one of a plurality of control programs.

Still further, in the above embodiments, the first control program is stored in ROM 104 of the printer. The present invention is not limited only to such a case. All control programs including the first control program may be of a cartridge type connected to a plurality of cartridge connectors. In such a case, each control program defines a shift command of FIG. 3 to allow the operations at steps S608 to S611 shown in FIG. 6.

In the above embodiment, the end of the data which is passed by without printing it because the second control program does not exist, is determined by searching the main body shift command table in ROM 104. The present invention is not limited only to such a case. For example, the main body shift command table may be down-loaded from the host computer into a RAM, e.g., at the time immediately after power is turned on.

A plurality of main body shift command tables may be stored in ROM cartridges to be detachably connected to cartridge connectors.

By preparing a plurality of main body shift command tables, it is possible to readily deal with an addition of a program cartridge supporting a new command system.

In the above embodiment, switching between control programs is performed by using two commands including the cartridge shift command and main body shift command. The present invention is not limited only to such a case. For example, the characteristic of a command system may be derived from a data sequence sent from the host computer, to automatically select the corresponding control program.

In such a case, provided on the printer side is a table for deriving a characteristic of a command system corresponding to the main body shift command from table the or an analysis program. Using this table or program, a transition position between command systems is checked. After detecting the transition position, if the control program for the command system to be transferred does not exist on the main body side or as a program cartridge, the data is passed by without printing it until the next transition position is detected upon deriving the characteristic of the command system. A user can deal with various command system data without considering switching between control programs.

In the printer of the above embodiment which can mount a plurality of control programs, data which does not match a command type is passed by without printing it. The present invention is not limited only to such a case. For example, also in a printer supporting only one control program and one command system, a shift command may be checked or the characteristic of a command type may be derived, to pass by data other than that of a command system supported by the printer.

According to the present invention, of various data each having a different command system, data having a command system not supported by the printer can be passed by without printing it. Therefore, it is possible to avoid waste prints and allow continuous operation of the printer even if there is improper data.

The present invention is not limited to the above embodiment, but various modifications are possible which fall within the scope of the appended claims.

What is claimed is:

1. A data processing apparatus, comprising:
   means for receiving data in one of a plurality of command languages;
   a data processor for processing the data;
   a first specifying means for specifying which one of the plurality of command languages describes the received data;
   judging means for judging whether or not data in the specified command language can be processed by said data processor;
   means for continuing to receive the data even if the judgment is that data in the specified command language cannot be processed by said data processor; and
   a second specifying means for specifying a different one of said plurality of command languages to describe the data if the judgment is that data in the originally specified command language cannot be processed by said data processor.

2. A data processing apparatus according to claim 1, wherein the received data includes a first designating data which designates the command language which describes the received data, with said first specifying means specifying which one of the plurality of command languages describes the received data on the basis of the first designating data.

3. A data processing apparatus according to claim 2, wherein the received data includes a second designating data which designates the command language which describes the data said data processor can process, with said second specifying means specifying the command language which describes the data said data processor can process based on the second designating data.

4. A data processing apparatus according to claim 3, wherein the received data is image data.

5. A data processing apparatus according to claim 4, including a pixel memory for storing pixel data, with said data processor storing pixel data in said pixel memory on the basis of the received image data.

6. A data processing apparatus according to claim 5, including a printer which prints on the basis of the pixel data stored in said pixel memory.

7. A data processing apparatus according to claim 6, wherein said printer prints a message indicative of the judgment of whether or not the received data can be processed by said data processor.

8. A data processing apparatus according to claim 6, wherein said printer is a laser printer.

9. A data processing apparatus according to claim 3 including a table which stores the second designating data for each of the plurality of command languages other than the specified command language.

10. A data processing apparatus according to claim 1, wherein said data processor includes:
    a ROM which stores a program for processing the received data.

11. A data processor according to claim 1, wherein the plurality of command languages are each page description languages.

12. A data processing apparatus according to claim 1, wherein said data processing apparatus includes:
    a connector attached to said data processor; and
    a storage device which is removably connected to said connector, with said storage device storing a program for processing the data in the originally specified command language, with said first specifying means specifying that said data processor cannot process data in the specified command language when said storage device is disconnected from said connector.

13. The data processing apparatus according to claim 1, including:
    a display device; and
    means for displaying a message on said display device which is indicative of the judgment of whether or not the received data can be processed by said data processor.

14. A data processing apparatus according to claim 1, wherein said data processing apparatus includes:
    a plurality of connectors attached to said data processor; and
    a plurality of storage devices which are removably connected to respective ones of said plurality of connectors, with each of said storage devices storing data for identifying a respective one of said plurality of command languages and a program for processing data in the respective ones of said plurality of command languages.

15. A data processing apparatus, comprising:
    means for receiving data;
    a data processor for processing received data by said receiving means;
    specifying means for specifying which one of a plurality of command languages describes data received by said receiving means;
    judging means for judging whether or not data in the specified command language can be processed by said data processor; and
    means for controlling said receiving means to receive the data in the specified command language even if the judgment is that the data in the specified command language cannot be processed by said data processor,
    wherein said specifying means specifies a different one of said plurality of command languages to describe data received by said receiving means, followed by the data in the specified command language, which cannot be processed by said data processor.

16. A data processing apparatus according to claim 15, wherein the received data includes designating data which designates the command language which describes the received data, and
    wherein said specifying means specifies which one of the plurality of command languages describes the received data on the basis of the designating data.

17. A data processing apparatus according to claim 16, wherein the received data comprises image data.

18. A data processing apparatus according to claim 17, including a pixel memory for storing pixel data, wherein said data processor generates and stores pixel data in said pixel memory on the basis of the received image data.

19. A data processing apparatus according to claim 18, including a printer which prints on the basis of the pixel data stored in said pixel memory.

20. A data processing apparatus according to claim 19, wherein said printer prints a message indicative of the judgment of whether or not the received data can be processed by said data processor.

21. A data processing apparatus according to claim 19, wherein said printer is a laser printer.

22. A data processing apparatus according to claim 16, including a table which stores the designating data for each of the plurality of command languages.

23. A data processing apparatus according to claim 15, wherein said data processor includes a ROM which stores a program for processing the received data.

24. A data processor according to claim 15, wherein the plurality of command languages are each page description languages.

25. A data processing apparatus according to claim 15, wherein said data processing apparatus includes a connector removably connected to a storage device for storing a program for processing the data in the predetermined command language, and wherein said specifying means specifies that said data processor cannot process data in the predetermined command language when said storage device is disconnected from said connector.

26. A data processing apparatus according to claim 15, including means for displaying a message on a display device which is indicative of the judgment of whether or not the received data can be processed by said data processor.

27. A data processing apparatus according to claim 15, wherein said data processing apparatus includes a plurality of connectors capable of being connected to a different one of a plurality of storage devices, and
wherein each of said plurality of storage devices stores data for identifying a respective one of said plurality of command languages and a program for processing data in the respective ones of said plurality of command languages.

28. A method of operating a data processing apparatus, comprising the steps of:
receiving data in one of a plurality of command languages;
processing the data by a data processor;
specifying which one of the plurality of command languages describes the received data;
judging whether or not data in the specified command language can be processed by the data processor;
continuing to receive the data even if the judgment is that data in the specified command language cannot be processed by the data processor; and
specifying a different one of the plurality of command languages to describe the data if the judgment is that data in the originally specified command language cannot be processed by said data processor.

29. The method according to claim 28, wherein the received data includes a first designating data which designates the command language which describes the received data, with the original specification of which one of the plurality of command languages describes the received data being on the basis of the first designating data.

30. The method according to claim 29, wherein the received data includes a second designating data which designates the command language which describes the data the data processor can process, with the specification of the command language which describes the data the data processor can process being based on the second designating data.

31. The method according to claim 30, including the step of:
storing in a table the second designating data for the respective command languages.

32. A method of operating a data processing apparatus, comprising the steps of:
receiving data in one of a plurality of command languages;
specifying which one of the plurality of command languages describes the received data;
judging whether or not data in the specified command language can be processed by a data processor;
continuing to receive the data even if the judgment is that data in the specified command language cannot be processed by the data processor; and
specifying a different one of the plurality of command languages to describe data received, followed by the data in the specified command language, which cannot be processed by said data processor.

33. A method according to claim 32, wherein the received data includes designating data which designates the command language which describes the received data, and
wherein in each of the specifying steps, which one of the plurality of command languages describes the received data is specified on the basis of the designating data.

34. A method according to claim 33,
wherein in each of the specifying steps, which one of the plurality of command languages describes the received data is specified on the basis of the designating data, and a table of the designating data for the respective command languages.

* * * * *

UNITED STATES PATENT AND TRADEMARK OFFICE
CERTIFICATE OF CORRECTION

PATENT NO. : 5,444,826
DATED : August 22, 1995
INVENTOR(S) : KUNIO OKADA

It is certified that error appears in the above-identified patent and that said Letters Patent is hereby corrected as shown below:

ON TITLE PAGE

In [56] References Cited, under U.S. PATENT DOCUMENTS:
"5,165,014  0/1992  Vassav" should read
--5,165,014  11/1992  Vassar--.

COLUMN 2

Line 16, "drawings," should read --drawings.--.
Line 20, "invention," should read --invention.--.
Line 59, "andan" should read --and an--.

COLUMN 3

Line 27, "112" should read --112'--.

COLUMN 4

Line 35, "area" (first occurrence) should read --area 501--.

COLUMN 6

Line 56, "from" should read --from the--.
Line 57, "the" should be deleted.

UNITED STATES PATENT AND TRADEMARK OFFICE
CERTIFICATE OF CORRECTION

PATENT NO. : 5,444,826
DATED : August 22, 1995
INVENTOR(S) : KUNIO OKADA

It is certified that error appears in the above-identified patent and that said Letters Patent is hereby corrected as shown below:

COLUMN 7

Line 67, "claim 3" should read --claim 3,--.

Signed and Sealed this

Nineteenth Day of December, 1995

Attest:

BRUCE LEHMAN

Attesting Officer     Commissioner of Patents and Trademarks